Patented Feb. 25, 1936

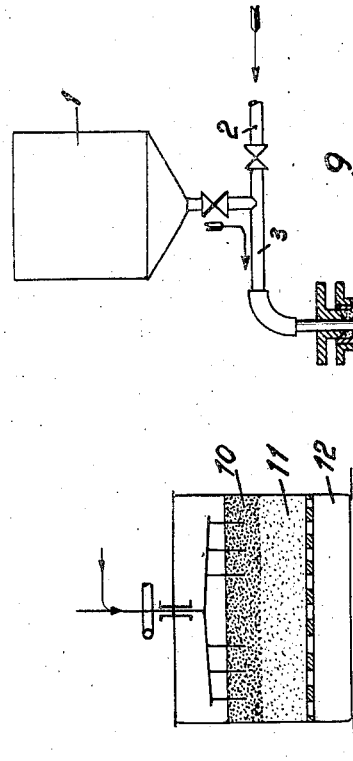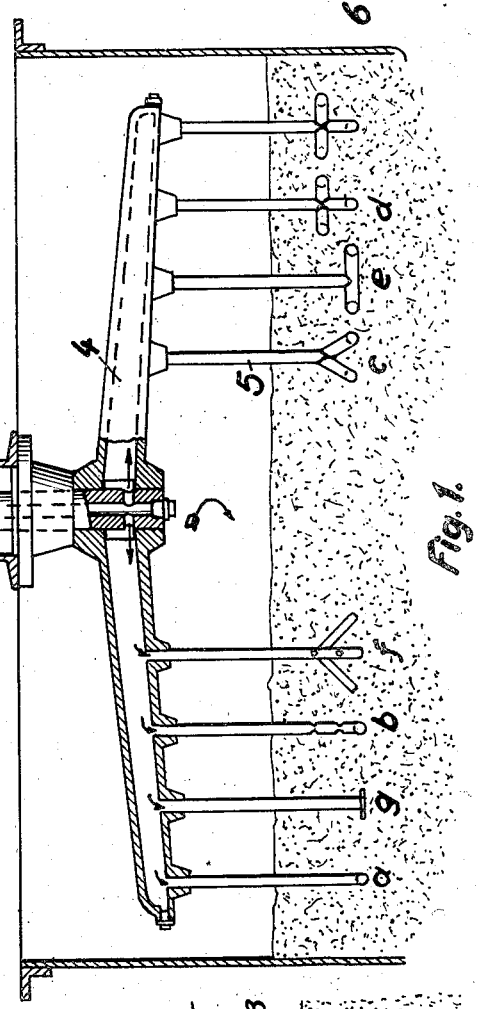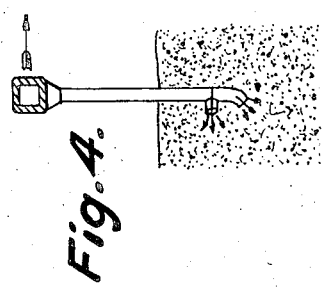

2,031,711

UNITED STATES PATENT OFFICE 2,031,711

PURIFYING OF WATER

Max Jaenicke and Gustav Bailleul, Frankfort-on-the-Main, Germany, assignors to Carbo-Norit-Union Verwaltungs-Gesellschaft m. b. H., Frankfort-on-the-Main, Germany, a corporation of Germany Application January 18, 1933, Serial No. 652,396
In Germany January 25, 1932

8 Claims. (Cl. 210—122)

This invention relates to a process of and apparatus for purifying liquids with pulverulent to fine grained adsorbent masses.

In connection with the purification of liquids it is known to employ adsorptive media, both in pulverulent and granular form.

When granular media are employed the general method of procedure consists in filtering the liquid that is to be purified, through the adsorptive masses. In the case of pulverulent to fine grained masses, stirring, or filtration in layers is usually practised.

The present invention relates, as stated at the outset, to the purification of liquids by means of pulverulent to fine grained adsorptive masses, this form of the adsorptive material offering considerable advantages with respect to the efficiency of purification. Its use in the stirring process and by filtration in layers, is, however attended with considerable difficulties, which usually outweigh the advantages. Thus, for example, the stirring process entails the employment of such extremely large quantities of the treating medium as to render the process uneconomical, and the subsequent deposition of the medium involves a very great waste of time. If it be desired to remove the medium in other ways, such as by filtration, considerable resistance in the filter has to be reckoned with, and this last difficulty is also encountered, in an intensified degree, in the case of filtration in layers, when it is frequently so great as to render the whole process quite impracticable.

It has now been ascertained that pulverulent to fine-grained adsorptive media can be used, without difficulty, if the adsorptive substances be employed, in a state of fine distribution, in filtering materials, such as sand, fine gravel or other suitable filters. The absorptive media can be distributed throughout the whole of the filtering material, or in only a portion—for example a top or bottom layer—of same. In the method of application according to the present invention, the adsorptive fine media act on the liquids under treatment in the same state of extremely fine distribution as in the stirring process. At the same time, they are traversed by the flow of liquid, as in the case of filtration in layers. In this manner, the invention unites the advantages of the existing methods of employing pulverulent to fine grained adsorptive media, without, however, being burdened with their drawbacks. The adsorptive media need not be employed, as in the stirring process, in uneconomically large amount, and the resistances to be overcome in filtration are not much greater than for example, in ordinary sand filters.

Adsorptive media of any kind may be used in carrying out the process, such as active carbon, silica gel, fuller's earth or the like. Brown-coal, true coal, bone black, peat, wood, and coking products, such as coke, semi-coke, wood charcoal, or other suitable substances, may also be employed.

The process can be applied to all possible kinds of liquids. For example, it can be employed for dechlorinating excessively chlorinated water, especially drinking water and effluent water, also for eliminating flavouring and odoriferous substances, such as sulphuretted hydrogen, chlorphenol, or the like, or for the removal of colouring substances such as humic acid. It is, moreover, applicable in the sugar industry, for example, for decolorizing clarified sugar or sugar solutions of all kinds, and for refining animal, vegetable or mineral oils. It is also suitable for purifying solutions of organic or inorganic salts.

The present process must not be confused with precipitations, in which use is made of fragmentary adsorptive media coated with deposited adsorptive media of different kind in a finely divided state. In such cases the deposited substances have become a firmly adherent portion of the carrier material and no longer capable of exerting independent functions in the same manner, for example, as pulverulent adsorptive media.

The process of the present invention can be performed by employing any convenient type of filter, such as ordinary sand filters, screen filters or the like. The filters may be straight-sided, funnel shaped or of other design. Sand filters offer special advantages especially in connection with water purification, in which case the present process does not require any special plant, any waterworks being able to use its existing rapid or slow filters without further trouble.

In the interest of good management, it is advisable to take care that there is a certain suitable relation between the grain-size of the filtering material and the adsorptive substances, and also the rate of flow of the water to be treated.

The adsorptive substances can be distributed in the filtering material in a variety of ways. Thus, the media can be mixed with liquids and flushed into the filtering material. The media can also be disposed in a layer on the filtering material and washed into the latter. Another possible way of distributing the adsorptive media in the interior of the filtering material is by raking it into said material, such as sand. The filtering material can also be mixed with the adsorptive medium and then charged into the filter. In many instances it is advantageous to mix only a portion of the filtering material with the adsorptive medium and then apply the mixture, on to or under a filtering layer which does not contain any adsorptive medium. Moreover, a filter charged, for example, with sand and water may be loosened or turned over, for the purpose of incorporating therewith a conjointly added adsorptive medium.

When the water to be treated contains certain flavouring or odoriferous substances, such as sulphuretted hydrogen, the presence of air, or the like, during the treatment, has the further effect of accelerating the removal of such substances, inasmuch as atmospheric air has an oxidizing effect—with formation of water and sulphur—from the sulphuretted hydrogen, through the agency of the catalytic action of the carbon-containing masses, and the resulting sulphur is far more readily and extensively adsorbed than would be the case if the sulphuretted hydrogen had not been decomposed.

In order more clearly to understand the nature of the present invention, reference is made to the accompanying drawing which illustrates diagrammatically and by way of example, a typical embodiment of apparatus for charging a sand filter or the like with adsorptive media, and in which:—

Fig. 1 is a section through the apparatus and the upper part of a filter;

Fig. 2 is a section through a sand filter with layers of adsorptive media incorporated by stirring; and Figs. 3 and 4 illustrate two forms of stirring devices.

In Fig. 1, 1 is a stock vessel for fine grained or pulverulent adsorptive media, such as active carbon. 2 is a flushing-water pipe, by means of which the adsorptive medium from the stock vessel 1 is flushed through the pipe 3 into the stirring arms 4 and thence, through the teeth 5 of the stirrer, into the filtering layer 6. The adsorptive medium is preferably in a condition of aqueous suspension in the vessel 1, which is then advantageously designed as an agitator.

In the embodiment shown, the hollow stirrer arms are mounted on a hollow shaft 7, rotatably mounted in the bearing housing 8. A worm drive 9 is provided. The rotary arrangement of the stirrer arms, and also the drive, may, of course, be carried out in any other suitable way.

The number of the stirrer arms may be varied according to circumstances. In some cases it may be advisable to have only a single arm, in others a plurality of arms. The arms may be either fixed or interchangeable, and their length also may vary according to requirements, some being shorter and others longer, or all may be of the same length.

To enable the adsorptive media to be introduced at different depths into the filtering material, the stirrer arms are also suitably arranged to be raised and lowered.

The teeth also may be of various designs. For example, there may be only one outlet *a*, or a plurality of outlets *b*. The teeth may be downwardly forked *c*, cruciform *d*, T-shaped *e* or be provided with solid stirring projections *f*. They may be of any convenient shape, slotted *g*, oval or round, and may also be interchangeable. The form of stirring device illustrated in Fig. 3 comprises the tubular member 13 adapted to convey the suspension of adsorptive material, supported on the solid tooth member 14 by means of clamps 15. The tooth construction illustrated in Fig. 4 is similar to those marked *a, b, c, d, e, f* and *g*, but illustrates still another arrangement of the discharge openings. In both Figures 3 and 4 the arrows indicate the direction of movement of the teeth.

In Fig. 2, 11 is the filtering layer into which a carbon layer 10 is stirred by means of the stirring mechanism.

The introduction of the adsorptive medium may be effected with the aid of the liquid to be purified, though, of course, another liquid can be used for the purpose. The combined application of the liquid to be purified and another liquid is also feasible.

If the liquid to be purified be itself employed for introducing the carbonaceous adsorptive medium, the first runnings of said liquid are preferably discarded, or else reunited with the water under treatment. In certain circumstances, the introduction may also be effected at a certain distance from the top or bottom of the layer of filtering material, such as at points about one quarter to one third of the total height of the layer, and measured from above or below.

The period at which the adsorptive medium is introduced may vary according to convenience. For example, it may be introduced at the outset, and the actual passage of the liquid under treatment commenced afterwards, or the introduction may be postponed until the liquid is in course of passage. Finally, the procedure may be adopted of effecting a supplementary introduction of the adsorptive media at intervals during the purification of the liquid under treatment.

The rate at which the current of liquid is supplied in carrying out the process depends on the momentary working conditions. It is preferable to admit the liquid introducing the adsorptive media at a higher velocity than that of the liquid to be treated. It is also of advantage to reduce the velocity of the former liquid gradually, during the period of introduction, to the velocity of the liquid that is to be treated.

In general, the adsorptive media will be introduced from above downwards, or vice versa, and passed through the filter in the same direction as the liquid to be treated. In some cases, it may be advantageous to pass the supply of adsorptive media and the liquid under treatment in opposite directions through the filter. Moreover, the adsorptive media may be introduced from above downwards and then in the opposite direction, or vice versa.

In order to explain the process of the present invention more fully, two typical methods of performance will now be described.

*Example 1*

A charge of 2.25 kgs. of pulverized active carbon and 3 cu. metres of water was introduced, at the rate of 1 cu. metre per second, into a sand filter with a filtering surface of 1 sq. metre and a sand bed 1 metre in depth. On the introduction of the carbon the filtration resistance of the sand filter was increased from 7 cm. to only 10 cm., whereas, for example in employing the same quantity of carbon in bed filtration, a resistance of about 10 metres was set up. Following the introduction of the carbon, water was passed—also from above downwards—through the filter, at a rate of about 0.5 cm. per second. For a few minutes, the effluent water contained a little carbon, but after 5 minutes it came away perfectly limpid and free from carbon, so that, at the end of that interval, the water being treated, which had an extremely disagreeable taste of chlorphenol, could be passed on to the pre-treated sand filter, for purification, at the rate of .2 cm. per second. Before passing through the filter, the water contained about 0.2 mgrm. of chlorphenol per litre. 346 cu. metres of water could be passed through the filter, without any difficulties being encountered, before any taste or smell of chlor-phenol became apparent in the purified water. After putting the filter out of operation, the introduced carbon and the impurities deposited in the sand filter by the water, were removed by reflux washing, whereupon the sand filter was recharged with carbon.

Example 2

The top layer of sand in a sand filter, with a filtering surface of 1 sq. metre and a sand bed 1 metre in depth, was charged from above, to a depth of 10 cm. with 1.2 kg. of active carbon and about 0.3 cu. metre of water, introduced at the rate of about 0.2 cm. per second. A water containing about 10 mgs. of sulphuretted hydrogen and about 6 mgs. of atmospheric oxygen, per litre, was then passed through the filter at the same rate. After discarding the cloudy first runnings, the water was perfectly limpid and free from sulphuretted hydrogen. It was not until the filter had been in use for 20 hours and had passed about 150 cu. metres of water, that sulphuretted hydrogen could be detected in the filtrate, the concentration being about 0.05 mgrm. per litre, or only 0.5% of the amount originally present in the water. Consequently, the 1.2 kg. of finely divided active carbon adsorbed 1.4 kg., or 118% of its own weight, of sulphur.

We claim:—

1. A process of purifying water and other aqueous liquids which comprises filtering the same through a mass of granular non-adsorbent filtering material having intermingled therewith prior to use a relatively small proportion of powdered activated carbon.

2. In the purification of water and other aqueous liquids by filtering the same through a mass of granular filtering material intermingled with a pulverulent to fine grained adsorptive material the step which consists in introducing the adsorptive material into the mass of filtering material by introducing a suspension of the adsorptive material in a liquid into said mass of filtering material.

3. In the purification of water and other aqueous liquids by filtering the same through a mass of granular filtering material intermingled with a pulverulent to fine grained adsorptive material the step which consists in introducing the adsorptive material into the mass of filtering material by introducing a suspension of the adsorptive material in a liquid into said mass of filtering material while stirring said mass.

4. In the purification of water and other aqueous liquids by filtering the same through a mass of granular filtering material intermingled with a pulverulent to fine grained adsorptive material the step which consists in introducing the adsorptive material into the mass of filtering material by introducing a suspension of the adsorptive material in a liquid into said mass of filtering material at a predetermined distance from the surface of said mass.

5. In the purification of water and other aqueous liquids by filtering the same through a mass of granular filtering material intermingled with a pulverulent to fine grained adsorptive material the step which consists in introducing the adsorptive material into the mass of filtering material by depositing the adsorptive material on the surface of the mass and then flushing the adsorptive material into the mass of filtering material by the introduction of a liquid while stirring said mass.

6. Process as defined in claim 2 in which the rate of flow of the suspension is gradually reduced from a higher velocity to the velocity of the liquid being filtered.

7. A process of purifying water and other aqueous liquids which comprises filtering the same through a mass of granular filtering material intermingled with a pulverulent to fine grained adsorptive material, and after the purifying action of the adsorptive material has become exhausted, renewing the filter bed by washing exhausted adsorptive material out of and introducing fresh adsorptive material into the mass of filtering material.

8. Apparatus for filtering water and other aqueous liquids comprising a filter bed of granular filtering material and means for introducing pulverulent to fine grained adsorptive material into the mass of filtering material comprising an arm in the form of a conduit adapted to rotate in a horizontal plane over the surface of the filter bed, teeth in the form of conduits communicating with said arm and adapted to project into the filter bed, a receptacle for the adsorptive material, a conduit connecting said receptacle with said arm, and a conduit for liquid communicating with said last named conduit.

MAX JAENICKE.
GUSTAV BAILLEUL.